United States Patent [19]
Mercs et al.

[11] Patent Number: 5,999,906
[45] Date of Patent: Dec. 7, 1999

[54] SAMPLE ACCURATE AUDIO STATE UPDATE

[75] Inventors: Laura Mercs, Huntington Beach; Paul M. Embree, Irvine; James S. Mercs, Huntington Beach, all of Calif.

[73] Assignees: Sony Corporation; Sony Electronics, Japan

[21] Appl. No.: 09/034,300

[22] Filed: Mar. 4, 1998

Related U.S. Application Data

[63] Continuation of application No. 08/936,237, Sep. 24, 1997.

[51] Int. Cl.$^6$ ....................................................... G11B 5/09

[52] U.S. Cl. ........................... 704/500; 704/270; 704/272

[58] Field of Search ................................... 704/500, 270, 704/272

[56] References Cited

U.S. PATENT DOCUMENTS

| | | | |
|---|---|---|---|
| 5,208,678 | 5/1993 | Nakagawa | 360/19.1 |
| 5,283,700 | 2/1994 | Nagasawa et al. | 360/31 |
| 5,521,922 | 5/1996 | Fujinami et al. | 352/12 |
| 5,566,379 | 10/1996 | Mawatari et al. | 360/48 |

*Primary Examiner*—David R. Hudspeth
*Assistant Examiner*—Daniel Abebe
*Attorney, Agent, or Firm*—Fulwider Patton Lee & Utecht, LLP

[57] ABSTRACT

A method and apparatus for sample accurate parameter update management in digital audio recording/playback wherein a digital signal processor, memory, recording controller, and appropriate interfacing facilitate storage and retrieval of digital audio data samples continuously to achieve substantially seamless flow and sample accurate audio state updated at precisely designated times, all as required in such critical synchronizing applications as film dubbing.

13 Claims, 3 Drawing Sheets

SAMPLE ACCURATE AUDIO STATE UPDATE

This application is a continuation of application Ser. No. 08/936,237, filed on Sep. 24, 1997.

BACKGROUND OF THE INVENTION

1. Field of the Invention

This invention relates generally to improvements in systems for audio signal processing and, more particularly, to a new and improved system for sample accurate audio state update to insure that audio parameters are modified precisely at specified sample times.

2. Description of the Related Art

It is common practice in the recording/playback arts, i.e., those associated with film dubbing, musical recording and the like, to integrate plural channels of audio for mixing and/or editing the collective data base of audio information so that it is properly inserted in time synchronism with associated scenes on film or video tracks. In this regard, in recording and playback of multiple audio channels, it is absolutely necessary for all channels to remain in synchronization in order to avoid artifacts such as echoes and distortion. Unfortunately, when handling multiple channels of audio simultaneously, "punching in" (directing audio input to be recorded) and "punching out" (directing audio signals to be provided as output) repetitively for both recording and playback, it has become difficult to smoothly fade between events, modify audio parameters, such as gain, rate and the like, and obtain audio data flow which does not include audio "glitches" or artifacts due to mismatch or out of synch data samples. Much of these artifacts are due to individual and accumulated latencies inherent in the various subsystems and various typical operational procedures associated with such film dubbing systems.

Hence, those concerned with the development and use of improved dubbing systems and the like have long recognized the need for improved systems for sample accurate audio updating which avoids artifacts. The present invention clearly fulfills these needs.

SUMMARY OF THE INVENTION

Briefly, and in general terms, the present invention provides a new and improved sample accurate audio state update system which substantially eliminates undesirable artifacts.

By way of example, and not necessarily by way of limitation, the present invention provides a method and apparatus for sample accurate audio state updating wherein a digital signal processor, memory, recorder controller, and appropriate interfacing, facilitate updating of audio states continuously for modifying audio parameters precisely at specified sample times and to achieve substantially seamless flow of audio, as required in such critical synchronizing applications as film dubbing.

More particularly, the present invention may include a digital audio processor managing data so that appropriate time synchronization can be achieved with substantially seamless audio sample data flow. This is accomplished by a recorder controller which provides parameter change messages to the digital audio processor to insure that audio parameters are modified at specified sample times.

These and other objects and advantages of the invention will become apparent from the following more detailed description, when taken in conjunction with the accompanying drawings of illustrative embodiments.

DETAILED DESCRIPTION OF THE PREFERRED EMBODIMENTS

Figure 1:
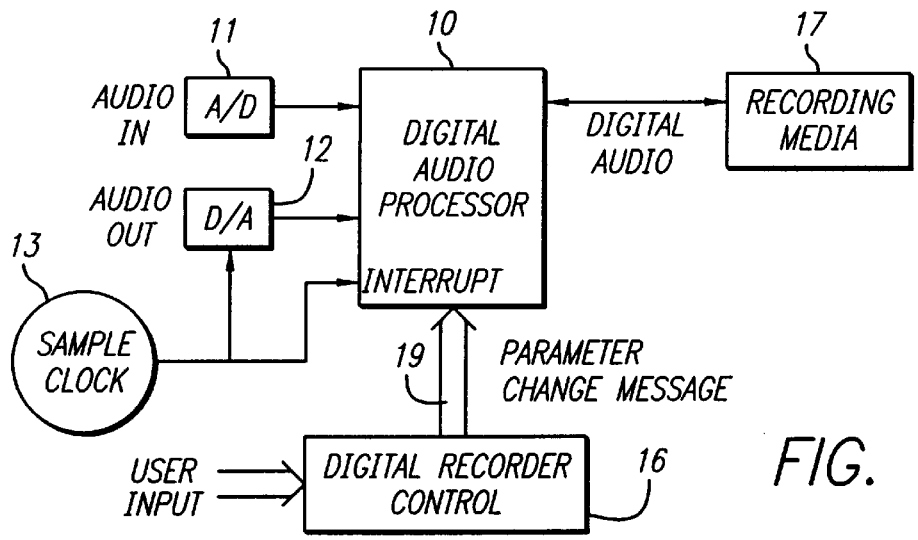
FIG. 1 is an overall block diagram illustrating a system in which the invention may be practiced.

Referring now to the drawings, like reference numerals denote like or corresponding parts throughout the drawing figures.

As best observed in FIG. 1, a digital signal processor, is utilized as a real-time digital audio processor 10, and includes a plurality of 32 bit floating point processors.

The processor 10 receives audio input either in direct digital audio format, typically at a sample rate of 44 KHz, 48 KHz or 96 KHz, or via an analog signal which is converted by an analog to digital converter 11. The digital audio processor 10 also provides audio output to a digital to analog converter 12 or other digital devices. Audio input and output to and from the processor 10 is continuous. Input audio may be from a film dubber, music, communications, or the like. Output audio may be to film, tape, speakers and the like. In typical film dubbing applications, an operator will handle multiple channels of audio, simultaneously, by repetitively and selectively punching-in and punching-out on a studio control panel, for both recording and playback, to obtain the desired mix of audio for recording on the sound track of film or video.

A sample clock 13 provides timing input to the processor 10 at one of the interrupt terminals of the processor. An interrupt is generated on each rising edge of the sample clock. When an interrupt is received it indicates that an input audio sample is ready and that an output audio sample must be generated before the next interrupt. Appropriate time stamps are associated with the digital samples of audio and specific sequences of audio. The time stamps allow the controlling processors to synchronize the start and stop of playback and/or recording of audio samples.

The time stamps and their role in sample accurate management are further elaborated upon in related copending applications Ser. No. 09/034,254 entitled BUFFER MANAGEMENT SYSTEM FOR DIGITAL AUDIO, inventors: Laura Mercs, Paul M. Embree and James S. Mercs and Ser. No. 09/034,493 entitled SAMPLE ACCURATE GPIO MANAGEMENT, inventors: Laura Mercs, Paul M. Embree and James S. Mercs, both filed concurrently with this application. The disclosures of both of these applications are hereby specifically incorporated by reference and copies of these specifications are attached as Appendices A and B, respectively.

An audio sample memory (not shown), typically DRAM, is associated with the digital audio processor 10. The processor 10 and its memory interface with a suitable recording media 17, such as a hard disc or the like, typically via an appropriate interface.

A digital recorder controller 16 provides audio state parameter change messages, over a bus 19, to the processor 10. The controller 16 typically includes a GUI interface (not shown) for interaction with a user. The GUI interface may be conveniently located on the front panel of the controller 16, or in a suitable handheld device or the like.

The system shown in FIG. 1 enables management of digital audio samples stored in the audio sample memory so that recording and/or playback of digital audio from memory can be recorded and played back on command in substantially seamless fashion and with appropriate audio state update for gain, rate, etc., without so-called "glitches" or loss of synchronization. This is accomplished by associating a time stamp with parameter change messages from the recorder controller 16 to the audio processor. The audio processors process the audio samples in response to a sample clock and, at the same time process the parameter change messages. While the system of FIG. 1 illustrates single channel flow in each direction, it is to be understood that this is for illustration purposes only, and a large number of multiple channels may be processed in the same manner without in any way departing from the spirit and scope of the invention.

Referring now more particularly to FIGS. 2–5 of the drawings, the application of the system of FIG. 1 to achieve sample accurate audio state updating, in accordance with the present invention, is described.

Figure 2:
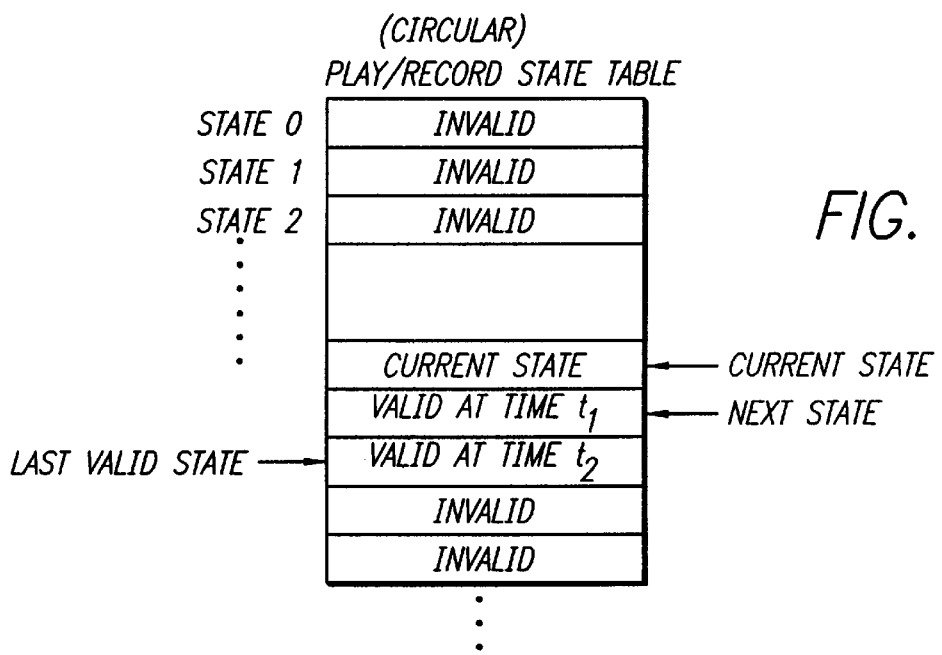
FIG. 2 is a flow chart illustrating a play/record state table in accordance with the invention.

Referring now to FIG. 2, there is shown a play/record state table structure for the sample accurate audio state update and illustrates states 0, 1, 2, . . . state N, and further illustrates current state, next state and last valid state. The "next" state is valid at time T1 and the last valid state is valid at time T2. All other states are shown to be invalid in the circular play/record state table. This table is located in and managed by the audio processor.

Figure 3:
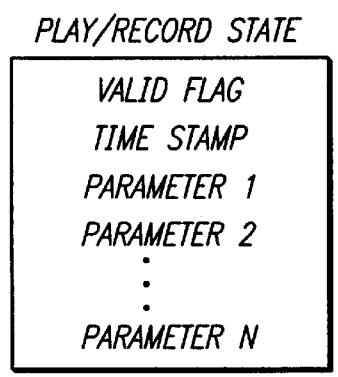
FIG. 3 illustrates play/record states.

FIG. 3 illustrates one play/record state including valid flag, time stamp, parameter 1, parameter 2 . . . parameter N where the parameters may be play rate, output gain, record enable and the like.

Figure 4:
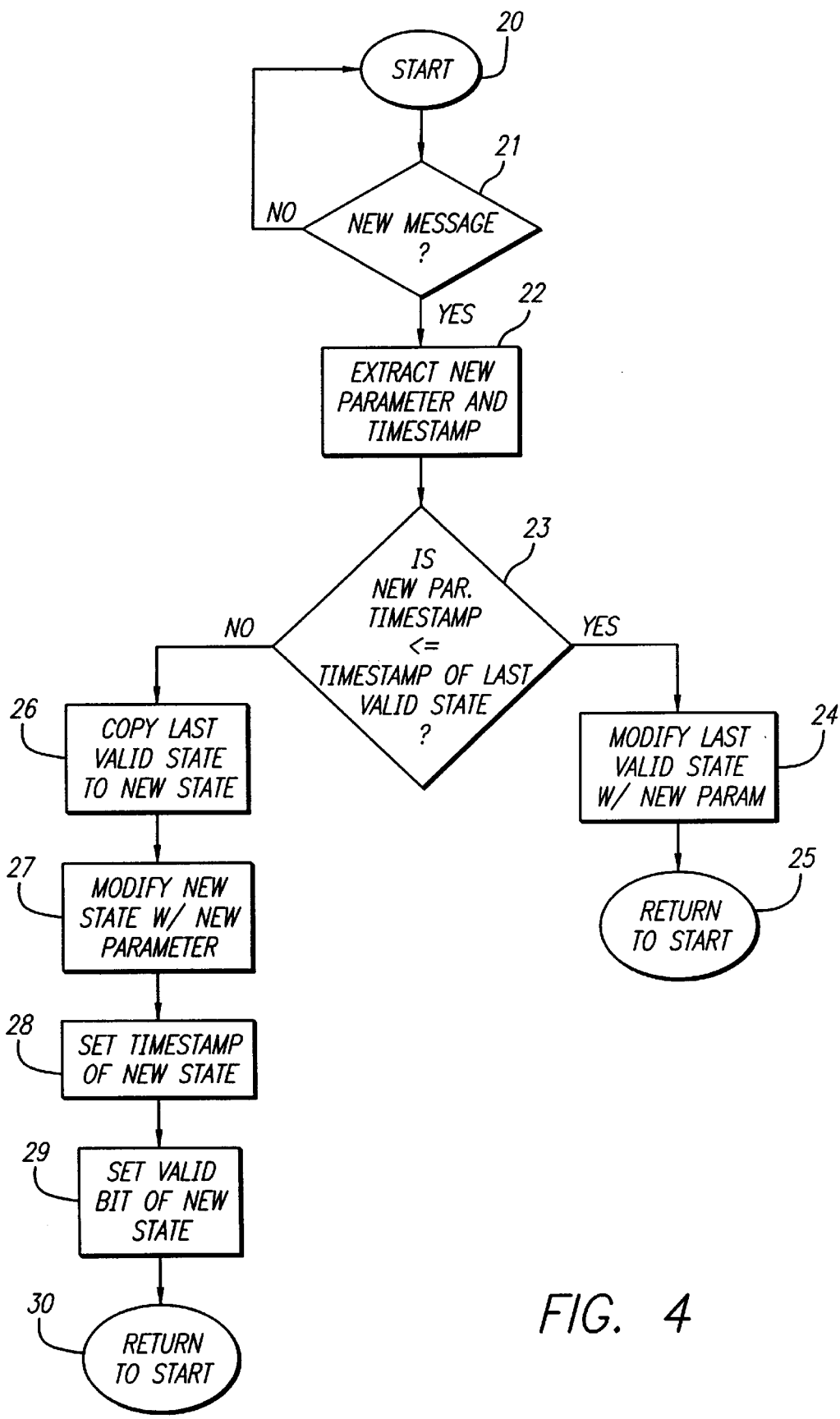
FIG. 4 is a flow chart for a message process in the practice of the invention.

As best observed in FIG. 4, the message process starts at step 20 and is queried at step 21 regarding whether there is a new message. If there is no message, then there is a return to start at step 20. If there is a new message, then the new parameter and time stamp in the new message is extracted at step 22. In step 23, determination is made as to whether the new parameter time stamp is less than or equal to the time stamp of the last valid state. If the answer in step 23 is affirmative, then the last valid state is modified by the new parameter, in step 24, and the routine then returns to start via step 25.

If the determination in step 23 is negative, then the last valid state is copied as the new state, in step 26. Next, in step 27, the new state is modified by the new parameter. In step 28, the timestamp of the new state is set equal to the new message timestamp. In step 29, the "valid" bit of the new state is appropriately set and, thereafter, there is a return to start via step 30.

Figure 5:
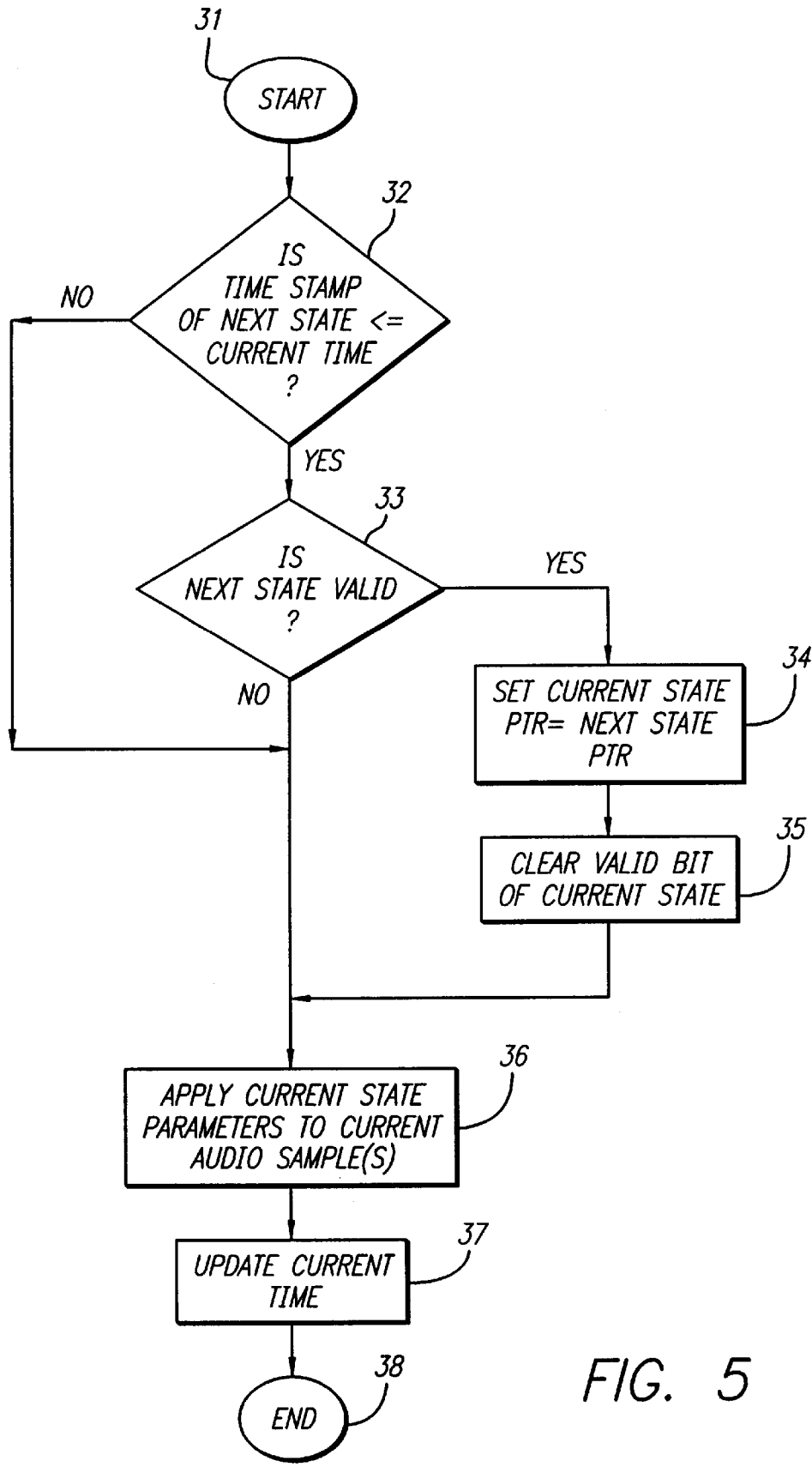
FIG. 5 is a flow chart for a real-time audio sample process in accordance with the invention.

Referring now to FIG. 5, the real-time audio sample process starts at step 31 and is initiated by a signal from the sample clock interrupt. Next, in step 32, a determination is made as to whether or not the time stamp of the next state is equal to or less than the current time. If the answer is affirmative, then a determination is made in step 33 whether or not the next state is valid. If the determination in step 33 is affirmative, then the current state pointer is set equal to the next state pointer in step 34. Next, in step 35, the valid bit of the current state is cleared. In step 36, the current state parameters are applied to current audio samples and the current time is updated in step 37. The routine then ends via step 38.

If the determination in step 32, regarding the time stamp of the next state, is negative, then steps 33, 34 and 35 are bypassed and the process proceeds directly to step 36 to apply current state parameters to current audio samples.

If the determination in step 33 is negative regarding the validity of the next state, then steps 34 and 35 are bypassed and the process proceeds to step 36.

Hence, the present invention satisfies a long existing need in the art for improved systems for sample accurate updating which avoids artifacts.

It will be apparent from the foregoing that, while particular forms of the invention have been illustrated and described, various modifications can be made without departing from the spirit and scope of the invention. Accordingly, it is not intended that the invention be limited, except as by the appended claims.

We claim:

1. In a system for processing digital audio signals to provide sample accurate audio updating for substantially eliminating artifacts, the combination comprising:
    a digital signal processing subsystem for generating and managing audio sample data to provide time synchronization for substantially seamless audio sample data flow, including a digital signal input and a digital audio signal output;
    a memory for said digital signal processing subsystem; and
    a digital recorder controller in communication with said processing subsystem for providing audio state update messages to modify audio parameters at specified sample times.

2. A system as set forth in claim 1, wherein said audio state update messages specify parameter changes.

3. A system for processing digital signals as set forth in either of claims 1 or 2, wherein said audio is synchronized with other external data.

4. A system for processing digital signals as set forth in either of claims 1 or 2, wherein said audio is synchronized with video.

5. A system for processing digital signals as set forth in either of claims 1 or 2, wherein said audio is synchronized with film.

6. A system for processing digital signals as set forth in either of claims 1 or 2, wherein said audio is associated with time codes.

7. A system for processing digital signals as set forth in either of claims 1 or 2, wherein said audio is associated with time codes which are SMPTE time codes.

8. A system for processing digital signals as set forth in claim 1, further comprising means for generating an interrupt for each digital audio signal and updating the audio state upon each change of audio state responsive to the interrupt, such that the audio state is sample accurate.

9. A system for processing digital signals as set forth in claim 8, wherein the interrupt generating means further comprise means for providing a timing input to the processing subsystem, and associating time stamps with audio samples and audio sequences, to enable the processing subsystem to synchronize start and stop of playback and recording of audio samples.

10. A method for processing digital audio signals to provide sample accurate audio updating for substantially eliminating artifacts, comprising:

receiving an audio signal input;

directing and storing said audio signal input in a memory;

generating and managing audio sample data to provide time synchronization for substantially seamless audio sample data flow; and modifying audio parameters at specified sample times for controlling the audio by periodically updated parameter changes from a digital recorder controller.

11. A method as recited in claim 10, further including:

monitoring the time codes and time stamps associated with said audio signal input.

12. A method as recited in claim 10, further comprising:

generating an interrupt for each digital audio signal; and updating the audio state upon each change of audio state responsive to the interrupt, such that the audio state is sample accurate.

13. A method as recited in claim 12, wherein the step of generating the interrupt further comprises providing a timing input to a processing subsystem, and associating time stamps with audio samples and audio sequences, to enable the processing subsystem to synchronize start and stop of playback and recording of audio samples.

* * * * *